June 13, 1961
C. D. SMITH
2,988,302
SILENCING MEANS FOR AIRCRAFT
Filed Jan. 14, 1959
2 Sheets-Sheet 1
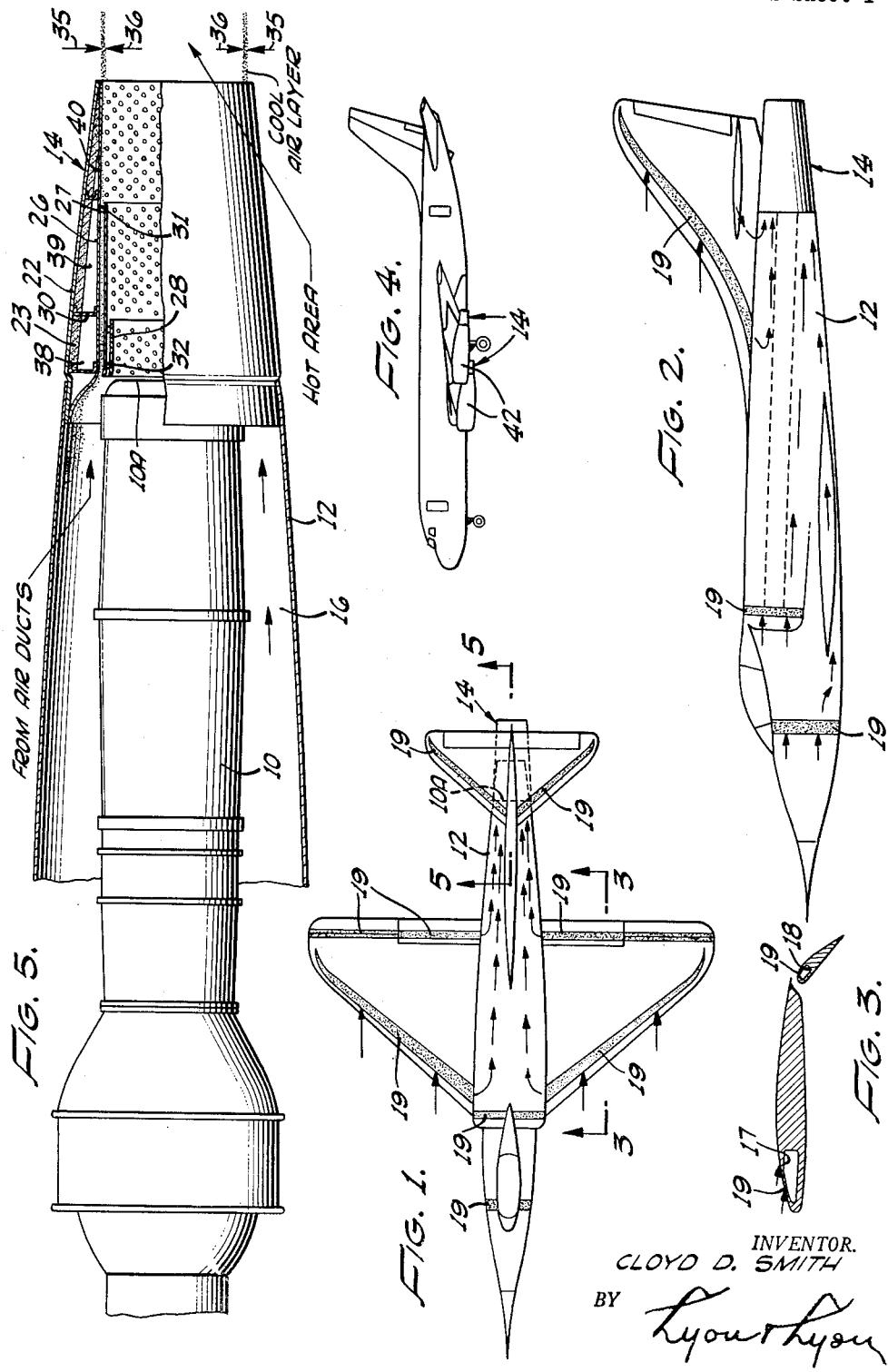
INVENTOR.
CLOYD D. SMITH
BY Lyon & Lyon
ATTORNEYS

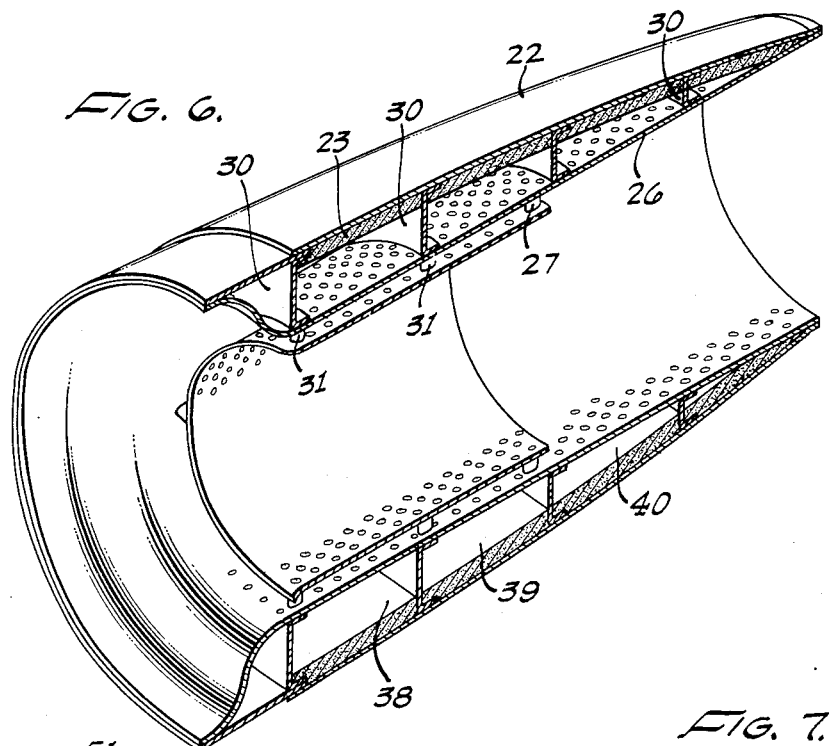
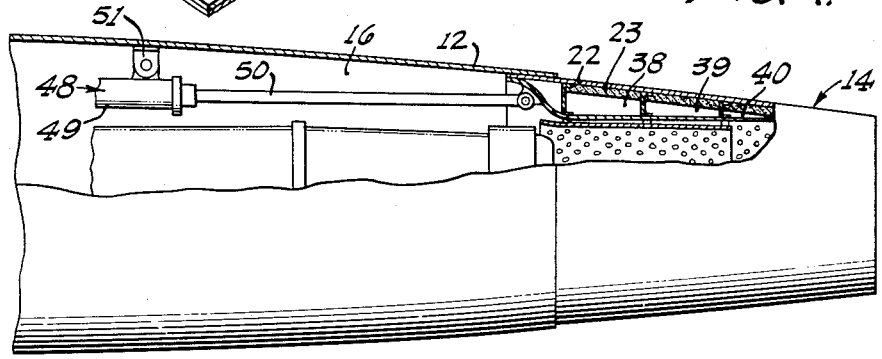
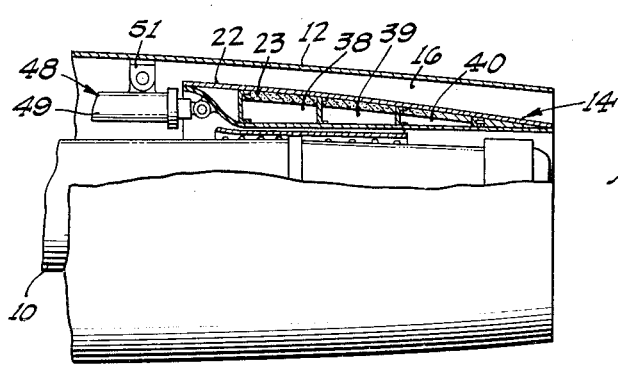

United States Patent Office 2,988,302
Patented June 13, 1961

1

2,988,302
SILENCING MEANS FOR AIRCRAFT
Cloyd D. Smith, Pacific Palisades, Calif., assignor to General Sound Control, Inc., Los Angeles, Calif., a corporation of California
Filed Jan. 14, 1959, Ser. No. 786,882
9 Claims. (Cl. 244—15)

The present invention relates to improved means and techniques useful in silencing aircraft particularly of the jet type and for improving the performance of the same.

The present application constitutes a continuation-in-part of my pending application, Serial No. 581,118 filed April 27, 1956, now abandoned, and assigned to the present assignee.

In accordance with features of the present invention, a new type of silencer is provided using boundary layer control. In its application to jet type aircraft, the silencer includes an effective aerodynamic diffuser operating in conjunction with an air ejector in such a way that their combined action permits the outer layers of the jet exhaust to expand and mix with an "insulating" layer of air brought into the periphery of the jet exhaust by the action of the ejector. This interaction of the diffuser and ejector helps to silence the jet exhaust flow by "smoothing" out the jet stream. The silencing action involves also the use of an enclosing structure that acts as a "resonating chamber" type of silencer which is effective particularly for low frequency noise.

It is, therefore, a general object of the present invention to provide improved means and techniques which function generally as indicated above, for jet type engines.

A specific object of the present invention is to provide a silencing action without detrimental effect on the thrust, otherwise accomplished by a jet engine and indeed the thrust may be increased with proper design.

Another specific object of the present invention is to provide, for these general purposes, a light weight structure which may be attached to the engine or airplane without serious weight penalties.

Another specific object of the present invention is to provide an arrangement of this type in which the air ejector is associated in a novel manner with a chamber in the airplane nacelle or fuselage to provide a source of high velocity air flow to meet the requirements of boundary layer control.

Another specific object of the present invention is to provide a silencer of this character which may be retracted into the fuselage of the aircraft in normal flight when the production of noise is no longer seriously objectionable.

Another specific object of the present invention is to provide an improved silencer construction.

Another specific object of the present invention is to provide improved means and techniques for reducing noise from jet engines which is otherwise produced by the shearing action of the high velocity jet exhaust with the adjacent atmosphere.

Another specific object of the present invention is to provide improved means and techniques whereby the effectiveness of a silencer is not only enhanced but also cooled to sufficiently low operating temperatures.

Another specific object of the present invention is to provide improved means and techniques whereby a jet exhaust may expand and mix with augmented air to reduce the shearing action with the atmosphere and thus reduce noise.

2

Another specific object of the present invention is to provide an improved silencer which may be conveniently added to the fuselage or nacelles of aircraft.

Another specific object of the present invention is to provide an arrangement for these general purposes in which induced air is used also in reducing skin temperatures, as well as to aid, reduce or delay shock wave phenomena common to supersonic aircraft, as well as to also increase the effectiveness of the controls.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

FIGURE 1 is a top plan view of a jet aircraft embodying features of the present invention.

FIGURE 2 is a side view of the aircraft shown in FIGURE 1.

FIGURE 3 is a sectional view taken substantially on the line 3—3 of FIGURE 1.

FIGURE 4 is a side view of a different type of jet aircraft also embodying features of the present invention.

FIGURE 5 is a sectional view taken substantially on the line 5—5 of FIGURE 1.

FIGURE 6 is a perspective view, partly in section, of a portion of the silencing arrangement shown in FIGURE 5.

FIGURES 7 and 8 illustrate a silencer embodying features of the present invention in, respecively, an extended position and a retracted position in the fuselage of aircraft.

The jet aircraft shown in FIGURES 1 and 4 both include a silencer constructed as shown in FIGURES 5 and 6. While the silencer is built in as a part of the aircraft in FIGURE 1, the silencer in the aircraft in FIGURE 4 is built in as an extension of the pods mounted under the wing structure.

The aircraft in FIGURE 1 includes a conventionally mounted jet engine 10 which extends in and generally centrally through the tail section of the aircraft, being surrounded by the fuselage or nacelle structure 12. The silencer structure having the general reference numeral 14 is mounted as a streamlined extension of the nacelle structure, and the exhaust gases of the jet engine, as well as a boundary layer of air, passes therethrough. The exhaust end of the jet engine 10 is indicated at 10A. The air which forms a boundary layer is introduced into the chamber 16 through suitable ducts from suitable openings in the outer skin surface of the aircraft. These openings may be located at any one or more of the regions indicated by stipling in the drawings, with the flow of air through the interconnecting ducts, as indicated by the arrows.

The interconnecting ducts, as exemplified by the ducts 17 and 18 in FIGURE 3 in the wing and aileron structures, respectively, are partially defined by porous material 19 which provides a streamlined surface, yet is sufficiently porous or slotted to allow introduction of the air in the desired quantity. Such surfaces may be porous, slotted or, in general, be provided with a suitable opening or openings, preferably at those locations illustrated for securing boundary layer control over wings, control surfaces and fuselages. The air used for such boundary layer control is used also for securing other important features of the present invention. Such porous surfaces may, as shown, comprise not only portions of the wing and aileron structures but may also comprise a portion of the nose structure, as well as a part of the rearwardly disposed vertical stabilizer structure. Air from and passing through one or more of such porous surfaces enters the aforementioned chamber 16 for effecting a boundary layer control in the silencer 14, as well as in a region rearwardly of the silencer. In other words, two boundary layer control systems are achieved, using the same air.

While is is preferred that the air for boundary control be thus introduced as a result of flight of the aircraft, the desired flow of air in and out of the chamber 16 may be achieved by motor driven fans or air bled from the compressor section of the jet engine. Or, if desired, the air for silencing purposes may be introduced through annular slots or other openings in the exposed surfaces of the aircraft, as, for example, immediately forward of the silencer without necessarily achieving boundary layer control at such exposed surfaces.

The silencer structure 14 comprises generally a cylindrical or truncated conical structure that is suitably fastened to the fuselage or nacelle 12 as a streamlined extension thereof.

The structure 14 has an outer skin 22 which is lined with soft fibrous sound absorbing material 23, such material being covered with a metal foil or equivalent for withstanding and protecting the sound absorbing material against high temperature, high velocity gases. A plurality of perforated shrouds, such as the shrouds 26, 27 and 28, each of diminishing length, are concentrically arranged in spaced relationship within the outer skin member 22. While only three such shrouds are shown in FIGURE 5, the number, if desired, may be increased. The shrouds are of perforated metal but may also be slotted metal and may also have annular or transverse corrugations for thermal expansion and rigidity. These shrouds are maintained in spaced relationship by spacers or ribs 30, 31 and 32 that are sufficiently small to allow the flow of air through the space between adjacent shrouds.

The sound absorbing material 23 is in the form of a sound absorbing blanket of fibrous high temperature resisting fibrous material which is bonded to the outer shell 22 and also bonded to the ribs or spacers with high temperature adhesive. Such material 23 absorbs high frequency noise and dampens the metal structure and serves to increase the noise transmission loss through the structure. The outer shell 22, of course, is of solid metal, i.e. is not perforated.

As shown in FIGURE 5, air from the chamber 16 may flow as a concentric layer in different regions, namely: (1) in the region between the outer perforated shroud 26 and the intermediate shroud 27, and (2) between the intermediate shroud 27 and the inner shroud 28, and (3) in the interior portion of the inner shroud 28. In other words, such air may flow as a thin circular sheath adjacent (1) the inner surface of the outer shroud 26, (2) the inner surface of the intermediate shroud 27, and (3) the inner surface of the inner shroud 28. These three layers progressively merge and ultimately form a single layer which extends slightly beyond the rearwardmost part of the silencer, as indicated by the annular layer between the arrows 35 and 36. Such merging layer serves to interfere with the shearing action otherwise produced when the jet exhaust alone enters the atmosphere.

In other words, in accordance with one aspect of the present invention, the exhaust gases from the jet engine are allowed to expand and mix with augmented air to reduce the "shearing" action, and thereby noise is reduced. Also, an induced air flow through the silencer shrouds protects the silencer structure from high exhaust temperatures.

It is noted that the chambers 38, 39 and 40 defined, on the one hand, between the inner surface of the sound absorbing material 23 with the metal foil thereon, and, on the other hand, the outer surface of the shroud 26, are resonant chambers and are effective in reducing low frequency noise. The absorbent blanket 23 is particularly effective in reducing high frequency noise. As mentioned previously, the absorbent blanket provided by the absorbant material 23, bonded to the outer shell 22 and also bonded to the ribs, dampens the metal structure and thereby increases transmission losses through the structure. In FIGURE 4 the silencer 14 is mounted as a streamlined structure with the pod 42, and a flow of air for boundary layer control is likewise induced through the silencer 14 for the same purposes as mentioned above.

If desired, the silencer 14, as shown in FIGURES 7 and 8, may be mounted on the fuselage 12 so that it may be extended, as shown in FIGURE 7, or retracted, as shown in FIGURE 8, by a hydraulically operated mechanism 48 which includes a fluid cylinder 49 and piston 50, the cylinder 49 being mounted on the bracket 51 and the outer end of the piston 50 being attached, as shown, to the silencer structure.

Thus, in take-off operations, when it is desired to reduce noise, the silencer 14 is moved to its extended position, shown in FIGURE 7; but when in normal flight, the silencer 14 may be retracted, as shown in FIGURE 8, in which latter case the exhaust gases leaving the jet engine 10 enter the atmosphere directly without passing through the silencer. While operating with the silencer 14 in retracted position, the flow of air through the chamber 16 may either continue to flow, or such flow may be interrupted as desired, using suitable means for preventing such flow of air through the chamber in the latter instance.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A silencer arrangement for jet aircraft comprising an annular housing through which exhaust gases of the jet engine of the aircraft pass in a gas stream, a plurality of concentrically arranged acoustically transparent shrouds in said housing that surround said gas stream, means on said aircraft producing an independent flow of air past the surfaces of said shrouds for effecting boundary layer control, and acoustic silencing means surrounding said shrouds.

2. A jet aircraft having a fuselage, a jet engine in said fuselage, said fuselage defining a chamber, a silencer structure having an annular casing forming a streamlined extension of said fuselage, a plurality of foraminous shrouds concentrically arranged in radially spaced relation in said casing, sound absorbing material lining said casing, the exhaust of said engine passing through said casing, and means inducing a boundary layer of air from said chamber past the surfaces of said shrouds, and air duct means extending from chamber to a surface of said aircraft, said surface being defined by porous material.

3. An arrangement as set forth in claim 2 in which said shrouds have unequal lengths with the innermost shroud being shorter than the outermost shroud.

4. A jet aircraft having a fuselage and a jet engine, a silencer structure having an annular casing forming a streamlined rearward extension of said fuselage through which gases from said engine pass, a plurality of foraminous shrouds concentrically arranged in said casing in radially spaced relation, and sound absorbing material lining said casing.

5. An arrangement as set forth in claim 4 in which said shrouds have unequal lengths with the innermost shroud being shorter in length than the outermost shroud.

6. An arrangement as set forth in claim 4 including means for passing an air stream past the inner surfaces of said shrouds.

7. An arrangement as set forth in claim 4 in which said casing and the outermost shroud define a resonant chamber of decreasing size in the direction extending rearwardly.

8. An arrangement as set forth in claim 2 including means for moving said silencer structure from an ineffective position to an effective position and vice versa.

9. An arrangement as set forth in claim 4 including means for moving said silencer structure from an ineffective position to an effective position and vice versa.

References Cited in the file of this patent

UNITED STATES PATENTS 2,540,991   Price _____ Feb. 6, 1951

FOREIGN PATENTS 997,262   France _____ Sept. 12, 1951
1,157,063   France _____ Dec. 23, 1957

OTHER REFERENCES

Noise Control Magazine, pages 37–41 (July 1955).